US008762013B2

United States Patent
Bulgrien et al.

(10) Patent No.: US 8,762,013 B2
(45) Date of Patent: Jun. 24, 2014

(54) SHUTTLE STRATEGY FOR VEHICLES WITH ELECTRONICALLY CONTROLLED TRANSMISSIONS AND ENGINES

(75) Inventors: Garth H. Bulgrien, Ephrata, PA (US); Charles A. Hansen, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 865 days.

(21) Appl. No.: 12/614,748

(22) Filed: Nov. 9, 2009

(65) Prior Publication Data

US 2011/0112733 A1  May 12, 2011

(51) Int. Cl.
*G06F 19/00* (2011.01)

(52) U.S. Cl.
USPC ............................. 701/54; 701/51

(58) Field of Classification Search
CPC .................................. F16H 61/0246
USPC ..................................... 701/54, 51
See application file for complete search history.

(56) References Cited

U.S. PATENT DOCUMENTS

| | | | |
|---|---|---|---|
| 3,777,273 A | 12/1973 | Baba et al. | |
| 3,939,372 A | 2/1976 | Wurst et al. | |
| 4,570,118 A | 2/1986 | Tomczak et al. | |
| 4,719,419 A | 1/1988 | Dawley | |
| 4,942,394 A | 7/1990 | Gasiunas | |
| 4,955,228 A | 9/1990 | Hirose et al. | |
| 5,012,690 A | 5/1991 | Bulgrien | |
| 5,027,648 A | 7/1991 | Filleau et al. | |
| 5,036,718 A * | 8/1991 | Bulgrien ........................ | 74/335 |
| 5,053,960 A | 10/1991 | Brekkestran et al. | |
| 5,057,684 A | 10/1991 | Service | |
| 5,117,702 A | 6/1992 | Rodeghiero et al. | |
| 5,196,291 A | 3/1993 | Okada et al. | |
| 5,526,261 A * | 6/1996 | Kallis et al. ..................... | 701/51 |
| 5,708,496 A | 1/1998 | Barnett et al. | |
| 5,845,224 A | 12/1998 | McKee | |
| 5,916,291 A | 6/1999 | McKee | |
| 6,124,709 A | 9/2000 | Allwine | |
| 6,151,543 A * | 11/2000 | McKee et al. .................. | 701/55 |
| 6,367,337 B1 | 4/2002 | Schlabach | |
| 6,459,980 B1 | 10/2002 | Tabata et al. | |
| 6,482,122 B2 | 11/2002 | Ochiai et al. | |
| 6,549,839 B2 | 4/2003 | Katakura et al. | |
| 6,845,682 B1 * | 1/2005 | Bulgrien ........................ | 74/331 |
| 2007/0216403 A1 | 9/2007 | Asano | |

* cited by examiner

*Primary Examiner* — Fadey Jabr
*Assistant Examiner* — Aaron L Troost
(74) *Attorney, Agent, or Firm* — Sue E. Watson (57) ABSTRACT

A vehicle is configured to perform shuttle-shifting and comprises an engine and a power shift transmission operably connected with the engine comprising forward and reverse mechanical gears, the power shift transmission having more forward mechanical gears than reverse mechanical gears. The vehicle comprises a processor operably connected to the power shift transmission and to the engine, and is configured to receive a command from a user to establish a relationship between a last forward gear used and a desired reverse performance. The processor is configured to determine a desired reverse ratio based upon the last forward gear used and the established relationship and to select a reverse mechanical gear having a reverse gear ratio which is the same or less than the desired reverse ratio. The processor is configured to control the power shift transmission to shift to the selected reverse mechanical gear and if the reverse gear ratio of the selected reverse mechanical gear is less than the desired reverse ratio, an RPM of the engine is controlled to compensate for a difference between the reverse gear ratio of the selected reverse mechanical gear and the desired reverse ratio.

20 Claims, 3 Drawing Sheets

SHUTTLE STRATEGY FOR VEHICLES WITH ELECTRONICALLY CONTROLLED TRANSMISSIONS AND ENGINES

BACKGROUND OF THE INVENTION

By way of background, many transmissions contain multiple mechanical gears which apply different degrees of speed reduction or increase to the RPM of the engine coupled to the transmission. Conventionally, the forward gears are numbered sequentially, e.g. F1, F2, etc., in descending gear ratio order so that, for example, F1 provides the highest gear ratio and greatest speed reduction from engine speed for the greatest output torque. Off-road work vehicle transmissions also often have multiple reverse mechanical gears. Again, by convention, they are numbered sequentially, e.g. R1, R2, etc., in descending gear ratio order.

Off road work vehicles, such as agricultural or construction tractors or crawlers, are frequently used in shuttle operations in which the vehicle is driven forward and backward repeatedly and the forward and reverse speeds are related. The desired reverse speed may be the same as or slower or faster than the forward speed used. In some electronically controlled automatic transmissions, this forward/reverse relationship can even be programmed. The forward and reverse gears can be preselected or the reverse gear can be selected to be displaced upward or downward from the forward gear used such that the reverse speed may be one or more reverse gears higher than that of the selected forward gear, or the same as the selected forward gear, or one or more gears lower than that of the selected forward gear. The operation described above is ideal for transmissions that have gear paths that provide reverse gear ratios equal to equally spaced forward gear ratios for each gear ratio in the range of normal shuttling speeds used.

A shuttle shifting configuration in a power shift transmission enables the off-road work vehicle to "shuttle" back and forth (i.e., in forward and in reverse) when doing work or other activities without the operator actually having to identify and find the reverse gear to be used in the shuttle. This relationship between a forward gear and a reverse gear can be preset. A lever can be provided to shuttle shift from forward to reverse and vice-versa, based upon the present relationship, simplifying the procedure for the operator of the off road work vehicle. Some transmissions utilized in shuttle-shifting vehicles have reverse mechanical gears with reverse gear ratios which correspond to the gear ratios of consecutive forward mechanical gears. For example, in a transmission with twelve forward mechanical gears and five reverse mechanical gears, the five reverse mechanical gears will have gear ratios that correspond to five consecutive forward mechanical gears, such as one to five, three to 7, eight to twelve, etc. The shuttle-shifting technique, however, would not work well with a power shift transmission that does not have reverse gear ratios corresponding to the forward gear ratios or where some reverse gear ratios are missing, and the present invention addresses that problem.

U.S. Pat. No. 5,036,718 issued on Aug. 6, 1991, is titled "Shuttle Shift Transmissions," and its subject matter is incorporated by reference herein in its entirety. U.S. Pat. No. 5,012,690 issued on May 7, 1991, is titled "Programmable Shuttle Shifting in Transmissions," and its subject matter is incorporated by reference herein in its entirety. U.S. Pat. No. 5,526,261 issued on Jun. 11, 1996, is titled "Pseudo-Gear Transmission Control System and Method," and its subject matter is incorporated by reference herein in its entirety. U.S. Pat. No. 6,845,682 issued on Jan. 25, 2005, is titled "Smoothly Shifting Multispeed Transmission," and its subject matter is incorporated by reference herein in its entirety.

BRIEF SUMMARY OF THE INVENTION

In one aspect of the present invention, a vehicle is configured to perform shuttle-shifting. The vehicle comprises an engine and a power shift transmission operably connected with the engine comprising forward and reverse mechanical gears, the power shift transmission having more forward mechanical gears than reverse mechanical gears. The vehicle also comprises a processor operably connected to the power shift transmission and to the engine, and the processor is configured to receive a command from a user to establish a relationship between a last forward gear used and a desired reverse performance. The processor is also configured to determine a desired reverse ratio based upon the last forward gear used and the established relationship and to select a reverse mechanical gear having a reverse gear ratio which is the same or less than the desired reverse ratio. Additionally, the processor is configured to control clutches in the transmission to shift to the selected reverse mechanical gear. Also, the processor is configured such that if the reverse gear ratio of the selected reverse mechanical gear is less than the desired reverse ratio, an RPM of the engine is controlled to compensate for the difference between the reverse gear ratio of the selected reverse mechanical gear and the desired reverse ratio.

In another aspect of the present invention, a method for performing shuttle-shifting in an vehicle includes a power shift transmission operably connected to an engine, the power shift transmission including forward and reverse mechanical gears where the power shift transmission has more forward mechanical gears than reverse mechanical gears. The method comprises establishing a relationship between a last forward gear used and a desired reverse performance. Also, a desired reverse ratio is determined based upon the last forward gear used and the established relationship. The method also comprises selecting a reverse mechanical gear having a reverse gear ratio which is the same or less than the desired reverse ratio and sending a signal to the power shift transmission to shift to the selected reverse mechanical gear, and if the reverse gear ratio of the selected reverse mechanical gear is less than the desired reverse ratio, controlling an engine RPM to compensate for the difference between the reverse gear ratio of the selected reverse mechanical gear and the desired reverse ratio.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the Drawings.

DETAILED DESCRIPTION OF THE INVENTION

As stated above, shuttle-shifting techniques would not work well with a power shift transmission that does not have reverse gear ratios the same as the forward gear ratios or where some reverse gear ratios are missing. However, transmissions with reverse mechanical gears with gear ratios which do not correspond to those of consecutive forward mechanical gears may reduce cost and/or weight of a transmission because fewer reverse mechanical gears would be present. Thus, it would be useful to use such a transmission in vehicles designed for shuttle shifting. The problem that the present invention addresses is explained below in conjunction with the example shown at Table 1.

The first column of Table 1 shows the provision of fifteen forward gears numbered F1 through F15 in a transmission. These are the actual forward mechanical gears of the transmission of an off-road work vehicle. The last column identifies six actual reverse mechanical gears of the transmission as they would normally be represented to the operator, namely OR1-OR6. The middle column shows the same six reverse mechanical gears (RM1 through RM6) also identified by their gear ratio equivalence to various of the forward gears F1 to F11. Specifically, they are reverse gear equivalences ER1, ER3, ER4, ER7, ER8, and ER11 Thus, RM1, the first reverse mechanical gear, is also the reverse gear equivalent in gear ratio to first mechanical forward gear F1 and so is designated "ER1". The second reverse mechanical gear RM2, however, corresponds in gear ratio to the third forward mechanical gear F3 and so is designated "ER3". There is no reverse mechanical gear in the transmission which corresponds in gear ratio to F2. The same is true of F5, F6, F9, and F10. As shown in Table 1, there are no reverse mechanical gears having the same or comparable gear ratios as forward gears F2, F5, F6, F9, and F10. In other words, there are no ER2, ER5, ER6, ER9, and ER10 reverse gear equivalences in such transmission. Furthermore, since the convention has been to simply number the reverse mechanical gears in direct numerical sequence, e.g. OR1 through OR6, the operator would have to learn and remember the forward gear ratio equivalents of the sequentially numbered reverse mechanical gears RM1-RM6 provided in the transmission in order to predict the effects of choosing a particular reverse mechanical gear for shuttle operation.

TABLE 1

| Forward Mechanical Gears | Reverse Mechanical Gears ("RM") with Reverse Gear Equivalences ("ER") to Forward Mechanical Gears F | Operator Indication for Reverse Mechanical Gears |
|---|---|---|
| F15 | | |
| F14 | | |
| F13 | | |
| F12 | | |
| F11 | RM6 (ER11) | OR6 |
| F10 | | |
| F9 | | |
| F8 | RM5 (ER8) | OR5 |
| F7 | RM4 (ER7) | OR4 |
| F6 | | |
| F5 | | |
| F4 | RM3 (ER4) | OR3 |
| F3 | RM2 (ER3) | OR2 |
| F2 | | |
| F1 | RM1 (ER1) | OR1 |

During shuttle shifting operations with automatic transmissions configured to shuttle shift in this way, the offset between forward gears and reverse gears may be set by the operator. For example, if the operator wants to operate in a reverse gear that is lower in numerical order than a forward gear during shuttle shifting, the offset could be −1 (or −2 or −3). Typically, the offset is relative to the forward gear currently in use or to the forward gear last used if none is currently in use. Hereinafter, the term "last forward gear used" will be either the forward gear last used if none is currently in use, or the forward gear currently in use. The offset will be relative to the last forward gear used.

Programming reverse mechanical gears depending on the last forward gear used in the example above could generate unexpected or undesired results to the operator since the increase or decrease in speed during shuttling could be greater than expected or desired due to the missing reverse mechanical gears. For example, with an offset of −1, if the last forward gear used were gear F4, then the change in gear would be from F4 to RM2. Basically, the offset would be applied to F4 to arrive at F3, and RM2 would be selected because it corresponds in gear ratio to F3. Thus, the change in speed between forward movement and reverse movement during shuttle shifting would be based on one gear difference, as expected by the operator in view of the offset of −1.

However, if F7 were the last forward gear used, the −1 gear offset would require a reverse mechanical gear with a reverse gear ratio which is the same as the forward gear ratio of F6, which is absent in the present example, as is clear from Table 1. The reverse mechanical gears having the closest gear ratio to F6 would be RM3 (ER4) or RM4 (ER7). In the case of RM3, the change in speed between forward movement and reverse movement during shuttle shifting would be based on a three gear difference, which would be unexpected based on the offset of −1. Alternatively, in the case of RM4, there would be no change in speed, which would also be unexpected based on the offset of −1. Thus, shuttle shifting with a transmission where there is no consecutive correspondence of forward and reverse gear ratios could create unexpected results for the operator where the change in speed would not correspond with the offset.

The present invention addresses the above-identified problem by establishing "reverse virtual gear performances" to correspond with the missing reverse mechanical gears by combining mechanical gear selection and control of engine speed when a shift is made in order to maintain the operator programmed forward to reverse shuttle speed offset. Off-road work vehicles often run at full engine speed (i.e., highest RPMs), but are known to also run at operator set constant engine speeds, or at variable engine speeds which depend on real time or desired operator throttle control. For example, a constant engine speed can be set and be supplemented based upon the depression of a pedal or other instrument activation, which would raise the speed above the constant set point. Alternatively, the speed can be entirely controlled by a pedal or other instrument activation. The actual vehicle speed is a function of, inter alia, engine speed and the gear in use by the transmission.

A shuttle-shifting operation with an offset for forward and reverse shuttle shifting is, in effect, a way to ensure a particular relationship in ground speed between forward and reverse directions while shuttle-shifting. In the example above, the reverse virtual gear performances VGP2, VGP5, VGP6, VGP9, and VGP10 can be created to correspond to missing reverse gear equivalences, namely, ER2, ER5, ER6, ER9, and ER10. VGP2, VGP5, VGP6, VGP9, and VGP10 could be presented to the operator no differently than the "real" (i.e., mechanical) gears. The example shown at Table 2 below demonstrates the addition of the reverse virtual gear performances to the example shown at Table 1.

Table 2 shows, at the first column, the existence of forward gears F1-F15, which are the actual forward mechanical gears in the transmission. Table 2 shows, at the middle column, the combination of actual reverse mechanical gears RM1 through RM6 (and their corresponding equivalent reverse gear ratios ER1, ER3, ER4, ER7, ER8, and ER11, respectively), as well as the reverse virtual gear performances "VGP2", "VGP5", "VGP6", "VGP9", and "VGP10", created by the present invention to provide equivalent reverse speed performance to the remaining forward gears F2, F5, F6, F9 and F10, respectively. The third column represents the reverse mechanical gears and reverse virtual gear performances identified to the operator. The combination of real (i.e. mechanical) reverse gears and reverse virtual gear performances provides a full set of equivalents to forward gears F1 through F11 with no gaps, and can be presented to the operator as R1 to R11, as shown at column 3 of Table 2.

TABLE 2

| Forward Gears | Reverse Mechanical Gears ("RM") with Reverse Gear Equivalences ("ER") to Forward Mechanical Gears, and Reverse Virtual Gear Performances (VGP) | Operator Indication for Reverse Mechanical Gears and Reverse Virtual Gear Performances |
|---|---|---|
| F15 | | |
| F14 | | |
| F13 | | |
| F12 | | |
| F11 | RM6 (ER11) | R11 |
| F10 | VGP10 | R10 |
| F9 | VGP9 | R9 |
| F8 | RM5 (ER8) | R8 |
| F7 | RM4 (ER7) | R7 |
| F6 | VGP6 | R6 |
| F5 | VGP5 | R5 |
| F4 | RM3 (ER4) | R4 |
| F3 | RM2 (ER3) | R3 |
| F2 | VGP2 | R2 |
| F1 | RM1 (ER1) | R1 |

In the event that the offset is set at, for example, −1, and the last forward gear used is F7, shuttle-shifting according to the present invention would provide equivalent performance by the engine and transmission of a reverse mechanical gear with a gear ratio equal or at least comparable to that of F6 by the creation of reverse virtual gear performance six (VGP6). This would ameliorate the surprise that would ensue if the change were from F7 to RM3 or RM4, for example. Equivalent performance as used herein means a reverse speed equivalent to the reverse speed that would have been provided by an actual reverse mechanical gear with a gear ratio which corresponds to F2, F5, F6, F9, or F10.

Figure 1:
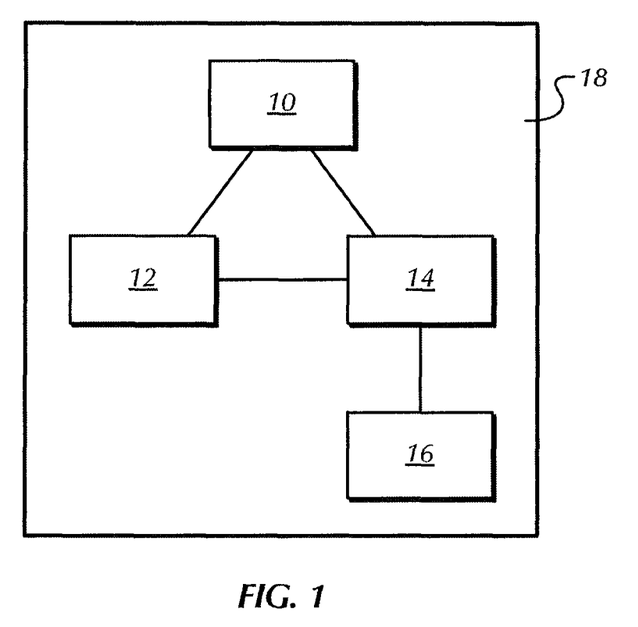
FIG. 1 is a block diagram of an off-road work vehicle according to the present invention.

Regarding FIG. 1, an off-road work vehicle 18 is configured to perform shuttle-shifting. The off-road work vehicle 18 comprises an engine 10 and a power shift transmission 12 operably connected with the engine 10. The power shift transmission 12 comprises both forward and reverse mechanical gears, and has more forward than reverse mechanical gears. Thus, there is not a one-to-one correspondence between the forward and reverse mechanical gears with regards to their gear ratios. For example, transmission 12 may be provided with fifteen mechanical forward gears (F1 through F15) but only six reverse mechanical gears (RM1-(ER1), RM2-(ER3), RM3-(ER4), RM4-(ER7), RM5-(ER8) and RM6-(ER11)). If the fifth forward gear (F5) provides a gear ratio of, for example, 6.52, there is not an equivalent fifth reverse mechanical gear with the same or a comparable gear ratio of 6.52. The term gear ratio is utilized in the present specification as the ratio of the engine speed into the transmission over the output speed from the transmission, resulting in positive numerical values only, as is typical in the relevant art. "Comparable gear ratio" means a ratio closer to the ratio of an identified forward gear than to the ratios of the next higher and lower forward mechanical gears in the transmission.

A processor 14 is operably connected to the power shift transmission 12 and to the engine 10. The processor 14 is the part of a computer system that operates on data and can be provided with electronic memory such as RAM, magnetic memory such as a standard hard disk, or semiconductor memory such as a flash device. The processor 14 need not be dedicated but can be one provided to perform other functions such as the normal operation of the power shift transmission or the ignition/operation of the engine, or both. The processor 14 of the present invention can be integral or separated. For example, using separate microchips to process different portions of what the processor 14 is disclosed to implement would still fall within the meaning of processor 14 according to the present description. The processor 14 is configured to receive commands from a user to establish a relationship between a last forward gear used and a desired reverse performance, where the established relationship is such that the desired reverse performance is the same or different from that of the last forward gear used. The last forward gear used is the forward mechanical gear which was used last (or is currently in use), such as F1, F2, F3, etc.

The off-road work vehicle will have an input device 16 with which an operator can set the relationship between forward gears and desired reverse performance during shuttle shifting. This input device 16 is preferably in the cabin of the off-road work vehicle 18, but can be anywhere in the off-road work vehicle 18. The input device 16 can be a lever or a keypad or a combination of the two, or another device that can be used to establish the relationship between forward and reverse performance for shuttle shifting. The input device 16 can be used to designate an offset between the last forward gear used and the desired reverse performance during shuttle-shifting. Such offset can be zero, −1, −2, +1, +2, etc. The relationship can remain set indefinitely until actively changed, or it can revert to a default setting when triggered to do so by other events, such as the vehicle being turned off. Preferably, the processor is programmed to permit an operator to choose whether the settings are set until deliberately changed, or until the off-road work vehicle is turned off, at which point the setting may be revert to a factory-installed setting or a baseline set up by the operator.

The processor 14 is preferably programmed to determine a desired reverse ratio based upon the last forward gear used and the established relationship. A desired reverse ratio is preferably a gear ratio which corresponds to a gear ratio of a forward mechanical gear which is determined by the application of the offset to the last forward gear used. For example, if the last forward gear used is F2 and the offset is +1, the desired reverse ratio is the gear ratio of F3. The determination of the desired reverse ratio can be triggered by an instruction from an operator to shift from forward to reverse as part of the shuttle-shifting. The desired reverse ratio would be determined based upon the last forward gear used and the established relationship. Preferably, if the established relationship is that the desired reverse performance is the same as that of the last forward gear used (i.e., a zero offset), then the desired reverse ratio will be determined to be the same as a gear ratio of the last forward gear used. In this case if, for example, the fourth forward gear (F4) was the last forward gear used, the desired reverse ratio would be the gear ratio of the fourth forward gear.

Preferably, if the established relationship is such that the desired reverse performance is different from that of the last forward gear used, then the desired reverse ratio will be determined as different from the gear ratio of the last forward gear used. Thus, if the relationship between the last forward gear used and the desired reverse performance is set to an offset of +2 or −2, then the desired reverse ratio will correspond to the gear ratio of the sixth forward mechanical gear or second forward mechanical gear, respectively, for a last used fourth forward gear.

In view of the above disclosure, the desired reverse ratio can match (exactly or approximately) the gear ratio of a forward mechanical gear. However, other configurations are also possible within the spirit and scope of the present invention.

In order to provide a reverse virtual gear performance, the processor 14 is configured to select a reverse mechanical gear having a reverse gear ratio which is the same or less than the desired reverse ratio. Any suitable procedure can be utilized to select such reverse mechanical gear. One possibility is to use a "lookup table" (see Table 3) below. Such lookup table can be stored in any digital form and any formatting and organization of the data is within the spirit and scope of the present invention. The lookup table preferably includes a listing of predetermined reverse ratios for reverse mechanical gears in the transmission that can be compared with the desired reverse ratio to select a reverse mechanical gear. In Table 3 below, the reverse gear ratio index numbers in the left column identify the predetermined reverse gear ratios in the right column. Other indexing methods are within the spirit and scope of the present invention. At the right column of Table 3, examples of the predetermined reverse ratio are provided, such as 15.92, and are based upon the gear ratios of the reverse mechanical gears of the transmission being utilized.

TABLE 3

| Reverse Gear Ratio Index | Predetermined Reverse Ratio |
| --- | --- |
| 1 | R1 ratio - slowest reverse gear (largest number, e.g., 15.92) |
| 2 | R2 ratio (e.g., 10.19) |
| 3 | R3 ratio (e.g., 8.15) |
| ... | ... |
| X | Rx ratio - fastest reverse gear (smallest number, e.g., 1.71) |

Figure 2:
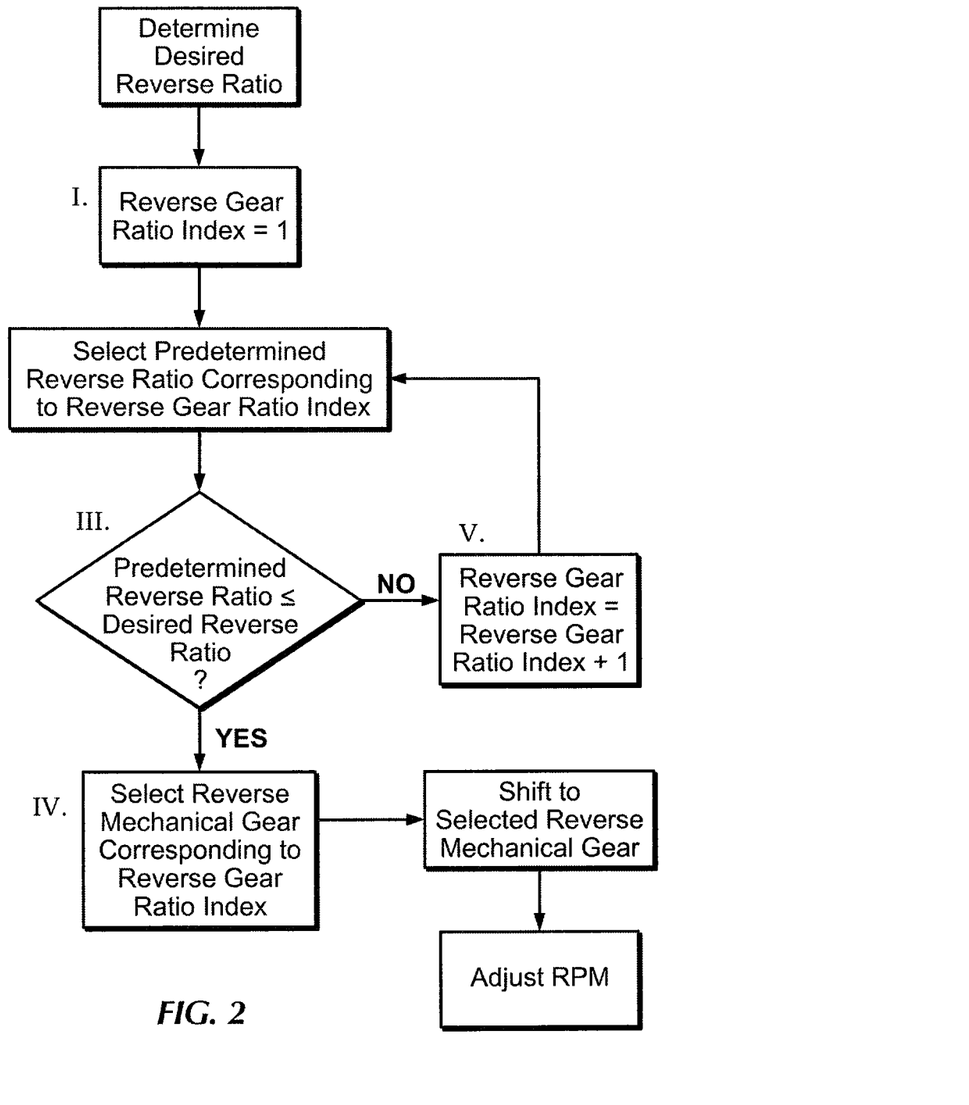
FIG. 2 is a flow diagram showing an embodiment of the present invention.

FIG. 2 is a flow diagram that shows one possible way to select a reverse mechanical gear having a reverse gear ratio which is the same or less than the desired reverse ratio. Once the desired reverse ratio is determined, steps I.)-V.) of FIG. 2 can be implemented by the processor 14

I.) Select a starting reverse gear ratio index number. Preferably, the first number is a lowest number possible for the reverse gear ratio index, and lower numbers for the reverse gear ratio index correspond to higher reverse gear ratios. The reverse gear ratio index corresponding to the highest reverse gear ratio (i.e., for the lowest reverse gear, such as R1) is preferably selected initially. The reverse gear ratios are preferably the actual ratios of the reverse mechanical gears and the values of the reverse gear ratio index preferably consecutively correspond to consecutive reverse mechanical gears. The reverse gear ratio index is preferably initially set equal to one, as shown in FIG. 2.

II.) Identify a predetermined reverse ratio corresponding to the reverse gear ratio index. For example, a predetermined reverse ratio (15.92) corresponding to the first reverse gear ratio index (i.e., 1) is identified. The reverse gear ratio index of one corresponds to a first reverse mechanical gear and the predetermined reverse ratio identified is the gear ratio of the first reverse mechanical gear. The information of Table 3 above is utilized by the processor 14 to identify the appropriate predetermined reverse ratio. Preferably, this information is predetermined and included as part of a lookup table which is present in electronic form and which may be made modifiable by the operator of the off-road work vehicle 18. Table 3 above shows a reverse gear ratio index list and respective predetermined reverse ratios that correspond to respective reverse gear ratio index numbers.

III.) Compare the predetermined reverse ratio of the selected reverse gear index number with the desired reverse ratio. If the predetermined reverse ratio is the same or less than the desired reverse ratio, then step IV.) below is carried out. If the predetermined reverse ratio is not the same or less than the desired reverse ratio (i.e., it is greater than the desired reverse ratio), then step V.) below is carried out.

IV.) If the predetermined reverse ratio is the same or less than the desired reverse ratio, then the reverse mechanical gear is selected which corresponds to the selected reverse gear ratio index. Thus, the reverse mechanical gear which is selected is the gear having the same gear ratio as the predetermined reverse ratio corresponding to the reverse gear ratio index.

V.) If the predetermined reverse ratio is more than the desired reverse ratio, the following takes place: The reverse gear ratio index is modified to correspond to a lower predetermined reverse ratio; the identifying of a predetermined reverse ratio in II.) above is repeated; and Step III.) is repeated. The modification of the reverse gear ratio index is preferably done by increasing the reverse gear ratio index by one unit, as shown in FIG. 2.

Once a reverse mechanical gear is selected, two steps take place in any order or, preferably, simultaneously. One step is the processor 14 sending a signal to the power shift transmission to effectuate a shift to the selected reverse mechanical gear. The other step is the processor 14 determining whether the gear ratio of the selected reverse mechanical gear is less than the desired reverse ratio, and, if so, controlling the RPM of the engine to compensate for the difference between the gear ratio of the selected reverse mechanical gear and the desired reverse ratio. The control of the RPM to "compensate" for this difference can be established as needed. For example, where the gear ratio of the selected reverse mechanical gear is lower than the desired reverse ratio, the processor can control, for example, an engine speed command such that the RPM of the engine is approximately equal to T×M/D, where T is the engine RPM based on an engine speed request (explained below). M is the gear ratio of the selected reverse mechanical gear, and D is the desired reverse ratio. Thus, the speed of the engine would be controlled to compensate for the difference in ratio. The end result is that the shuttle shifting will not create a surprising change of speed since the unequal number and spacing of forward gears relative to reverse gears will not cause an unexpected change in speed. Preferably, the gear shifting is done at the same time as the RPM control. Thus, if the RPM reduction and the gear shifting start at about the same time, the time it takes for the gear to shift will provide time for the engine to adjust to a new RPM. Starting the RPM change and the gear shifting simultaneously avoids adding any delay to the shuttle shift. As used herein, the engine speed request is the signal that is generated by the actions of the operator to control the speed of the engine. The operator can do so with a knob, a lever, a pedal, or any other input device. The result is a set engine speed or a variable engine speed, which is modifiable during the operation of the off-road vehicle. For example, if a pedal is used, the complete release of the pedal could generate an engine speed request for the engine to move at idle speed while the complete depression of the pedal could generate an engine speed request for the engine to move at maximum speed (i.e., maximum RPMs), and intermediate positions would generate engine speed requests in between idle and maximum engine speed. Thus, the engine speed request is a signal that is sent to the processor 14 to control the speed of the engine 10. Subsequently, the processor 14 will generate an engine speed command to control the speed of the engine 10. The generation of engine speed requests from an operator to a processor 14, with a subsequent engine speed command from the processor 14 to the engine 10 are known in the art and further explanation is not necessary for a full understanding of the present invention.

The "control" of the engine speed or RPM is, essentially, a reduction of engine speed relative to the engine speed request. Thus, if the engine speed request would ordinarily result in an RPM of the engine of X, the "control" of the engine speed may result in an RPM of less than X. Once the off-road work vehicle 18 is moving in reverse, the operator can change the engine speed request by, for example, depressing a throttle pedal. The change in engine speed request would change the RPM of the engine, but the engine would continue to be under the control of the processor 14 to compensate for the difference in gear ratio. Thus, the adjustment of the engine speed will remain during subsequent reverse direction operation of the off-road work vehicle. An alternative procedure to control the speed of the engine is to modify the engine speed request to reduce the RPM of the engine as determined by the processor 14 to compensate for the ratio difference. Thus, rather than controlling the engine with an engine speed command to obtain a particular engine RPM, the engine speed request can be modified accordingly to obtain the desired engine RPM.

In another embodiment of the present invention, the processor 14 selects a reverse mechanical gear having a reverse gear ratio which is more than the desired reverse ratio, and the RPM is adjusted upwards, rather than downwards. This would occur in situations where the RPM of the engine can go faster, and where it is better to choose a lower gear and increase RPM by a small amount rather than choose a higher gear and decrease the RPM a large amount. This would prevent a large reduction in available engine power due to a large reduction in RPM.

Figure 3:
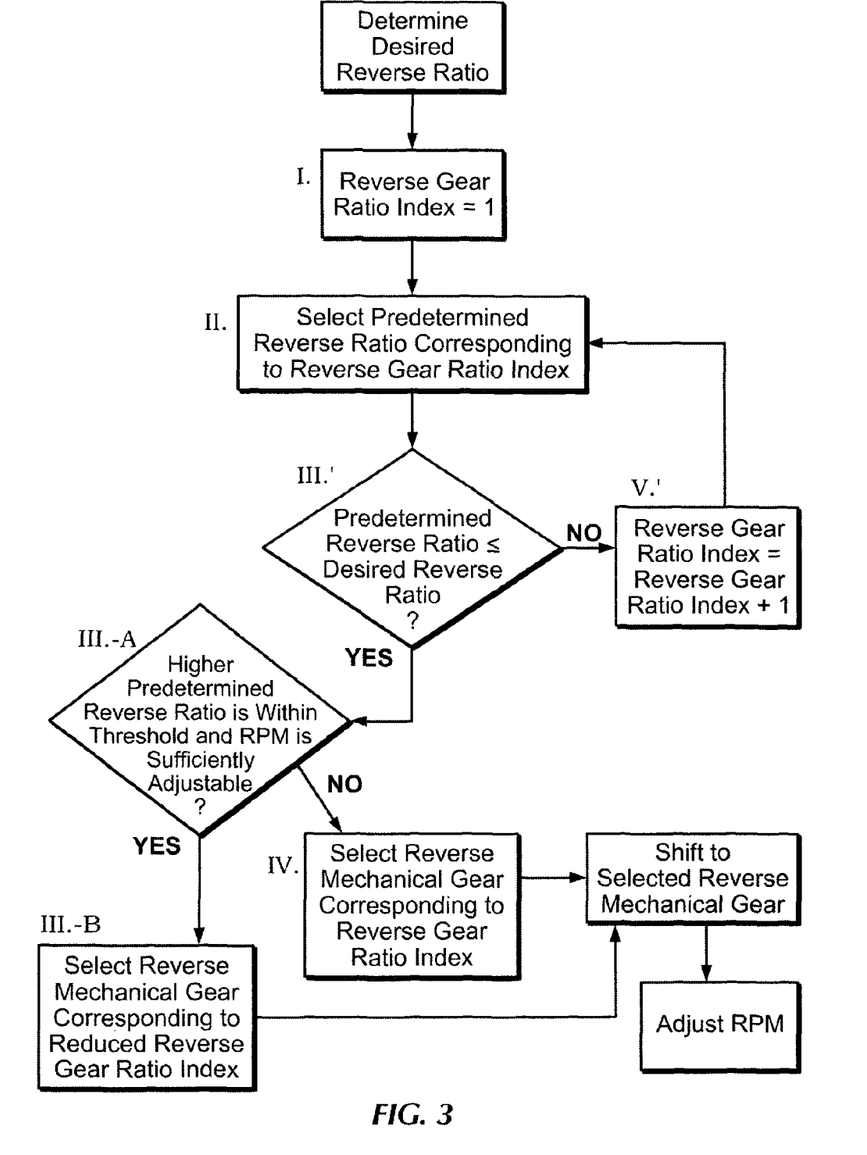
FIG. 3 is a flow diagram showing a further embodiment of the present invention.

Thus, once the desired reverse ratio is determined, the following steps of FIG. 3 can be implemented by the processor 14.

I.) This step is the same as step I.) above. Also, step I.) in FIG. 3 is the same as step I.) in FIG. 2.

II.) This step is the same as step II.) above. Also, step II in FIG. 3 is the same as step II in FIG. 2.

III.') This step is the same as step III.) above, except that if the predetermined reverse ratio is the same or less than the desired reverse ratio, then step III.-A) is carried out. Also, step III' in FIG. 3 is the same as step III. in FIG. 2, except that the following step is III.-A), not IV.

III.-A) A comparison is made between a) the desired reverse ratio, and b) the predetermined reverse ratio and a higher predetermined reverse ratio. The higher predetermined reverse ratio is the predetermined reverse ratio which corresponds to a reduced gear ratio index, which has one unit less than the reverse gear ratio index. Thus, if the reverse gear ratio index is 3, the predetermined reverse ratio would correspond to the reverse gear ratio index of 3 and the higher predetermined reverse ratio would correspond to a reduced reverse gear ratio index of 2. If the higher predetermined reverse ratio is closer to the desired reverse ratio by a predetermined reverse ratio threshold, and if the RPM of the engine can increase to compensate for the higher predetermined reverse ratio (i.e., if the RPM is at maximum, this cannot be done), then step III.-B) is carried out. Otherwise, step IV. is carried out.

The predetermined reverse ratio threshold can be a default setting or it can be set by the operator. Preferably, the predetermined reverse ratio threshold is a number which reflects the relative magnitude between the desired reverse ratio and the higher predetermined reverse ratio and the predetermined reverse ratio. For example, a predetermined reverse ratio threshold of 10% can be used. In this case, if the magnitude of the difference between the predetermined reverse ratio and the higher predetermined reverse ratio, is X, if the desired reverse ratio is within $0.1 \times X$ of the higher predetermined reverse ratio, then the higher predetermined reverse ratio is within the predetermined reverse ratio threshold.

To determine RPM adequacy, the following calculation is performed. An RPM of $T \times M/D$ is calculated, where T is the engine RPM based on an engine speed request from the operator. M is the gear ratio of the selected reverse mechanical gear, and D is the desired reverse ratio. In this case, the desired reverse ratio would be lower than the gear ratio of the selected reverse mechanical gear. Thus, the calculated RPM is higher than T. If the RPM of the engine can be increased to $T \times M/D$, then the RPM can be increased to compensate for the increased ratio. Otherwise, the RPM is deemed as not able to be increased to compensate for the increased ratio.

III.-B) A reverse mechanical gear is selected which corresponds to the reduced reverse gear ratio index.

IV.) This step is the same as step IV.) above. Also, step IV in FIG. 3 is the same as step IV.) in FIG. 2.

V.') This step is the same as step V.) above, except that the reference to step III.) is a reference to step III.') and the reference to FIG. 2 is a reference to FIG. 3.

The shifting to the selected reverse mechanical gear and the adjustment of RPM will be the same as described above, with the distinction that a different reverse mechanical gear is selected and a different M is utilized.

Once the off-road work vehicle 18 is moving in reverse, the operator of the vehicle may shuttle-shift in the forward direction. The steps would be as follows: The vehicle is driving in reverse. If a shift from reverse to forward is requested, the gear is switched to be that of the last forward gear used. The RPM of the engine will be based on the engine speed request generated by the operator (i.e., no control of the RPM will take place to compensate for any ratio differentials). Thus, when forward operation is desired, the processor 14 will select the last forward gear used as the forward gear for use and control the transmission to effectuate such a shift with the engine RPM being based on the engine speed request from the operator without adjustments. The RPM may increase when the system reverts back to the settings going forward. For additional refinement, preferably, the increase in RPM would be ramped up to make it less sudden for the operator. The ramping up may start when clutch engagement starts or when the clutch engagement is complete, or any time in between.

Sometimes, certain circumstances may make it impossible to achieve a situation where the predetermined reverse ratio is less than or equal to the desired reverse ratio if the above-listed steps are carried out. For example, if the operator desires to enter an offset that is positive and the last forward gear used is fairly high, the offset may require a reverse mechanical gear that is too high and does not exist. Thus, there would be no predetermined reverse ratio which is the same or lower than the desired reverse ratio. If the last forward gear used is too high for the offset being entered, the input device 16 or processor 14 may disallow such an offset. In such a situation, the system may provide the operator with an indication that the shuttle-shifting cannot be done exactly as requested or a message that the offset is too high. Alternatively, the offset could automatically be set to the nearest permissible offset and would be displayed as such to the operator.

If the offset is already chosen and then the forward gear is increased too much based on such an offset, an error could be indicated for the operator. Additionally, the processor 14 could be configured to automatically select the highest reverse mechanical gear for the next reverse movement. For example, the processor 14 may select the highest reverse mechanical gear when the desired reverse ratio is lower than the reverse gear ratios of all of the reverse mechanical gears.

Another way to address this issue is to check whether the reverse gear ratio index is a highest number possible and, if so, then the highest reverse mechanical gear corresponding to the highest number of the reverse gear ratio index would be selected, even if the predetermined reverse ratio is higher than the desired reverse ratio. Other suitable ways to address this situation are within the spirit and scope of the present invention.

The present invention is also directed to a method of performing shuttle-shifting in an off-road work vehicle. The steps involved in the method are explained above in connection with the disclosure regarding the off-road work vehicle operation.

Table 4 below shows information pertaining to, inter alia, forward and reverse mechanical gears and gear ratios for use with the examples below.

index is set to "3", which corresponds to a predetermined reverse ratio of 8.15, which is still higher than the desired reverse ratio of 5.22. The reverse gear ratio index is set to "4", which corresponds to a predetermined reverse ratio of 4.17, which is lower than the desired reverse ratio of 5.22. Thus, reverse mechanical gear RM4 is selected since it corresponds to the reverse gear ratio index of 4.

C) The transmission changes the gear from F8 to RM4, and the processor changes the gear display from F8 to R6.

D) A comparison is made between the reverse gear ratio of RM4 (4.17) and the desired reverse ratio (5.22). Since the reverse gear ratio of the selected reverse mechanical gear (4.17) is less than the desired reverse ratio (5.22), the RPM command to the engine is adjusted to be about 1600 (2000× 4.17/5.22=1598). Thus, the RPM of the engine has been controlled to account for the difference between the reverse gear ratio RM4 and the desired reverse ratio. The combination of the choice of RM4 as the reverse mechanical gear and the control of the engine RPM as described above provides a reverse virtual gear performance VGP6 corresponding in speed to F6 at 2000 RPM. The fact that there is no real R6 will not create a surprise to the operator since there will be consistency in the relationship between the vehicle speeds in forward and reverse.

EXAMPLE 2

A) Step A) from Example 1 is done, except that the engine speed is being controlled by a pedal of the vehicle. The

TABLE 4

| Forward Gears | Forward Gear Ratios of Forward Gears | Reverse Mechanical Gears ("RM") with Reverse Gear Equivalences ("ER") to Forward Mechanical Gears, and Reverse Virtual Gear Performances (VGP) | Reverse Gear Ratios of Reverse Mechanical Gears | Operator Indication for Reverse Mechanical Gears and Reverse Virtual Gear Performances | Reverse Gear Ratio Index | Predetermined Reverse Ratio Corresponding to Reverse Gear Ratio Index |
|---|---|---|---|---|---|---|
| F15 | 0.7 | | | | | |
| F14 | 0.88 | | | | | |
| F13 | 1.09 | | | | | |
| F12 | 1.37 | | | | | |
| F11 | 1.71 | ER11 (RM6) | 1.71 | R11 | 6 | 1.71 |
| F10 | 2.14 | VGP10 | | R10 | | about 2.14 |
| F9 | 2.67 | VGP9 | | R9 | | about 2.67 |
| F8 | 3.34 | ER8 (RM5) | 3.34 | R8 | 5 | 3.34 |
| F7 | 4.17 | ER7 (RM4) | 4.17 | R7 | 4 | 4.17 |
| F6 | 5.22 | VGP6 | | R6 | | about 5.22 |
| F5 | 6.52 | VGP5 | | R5 | | about 6.52 |
| F4 | 8.15 | ER4 (RM3) | 8.15 | R4 | 3 | 8.15 |
| F3 | 10.19 | ER3 (RM2) | 10.19 | R3 | 2 | 10.19 |
| F2 | 12.73 | VGP2 | | R2 | | about 12.73 |
| F1 | 15.92 | ER1 (RM1) | 15.92 | R1 | 1 | 15.92 |

EXAMPLE 1

A) The engine speed request of the operator is for the engine to have the maximum permitted RPM of 2000. The last forward gear is F8. The programmed offset is −2. The desired reverse ratio is 5.22, which is the gear ratio of forward mechanical gear F6.

B) The reverse gear ratio index is set to "1", which corresponds to a predetermined reverse ratio of 15.92. A comparison between the predetermined reverse ratio (15.92) and the desired reverse ratio (5.22) shows that the predetermined reverse ratio is higher than the desired reverse ratio. Thus, the reverse gear ratio index is set to "2", which corresponds to a predetermined reverse ratio of 10.19, which is still higher than the desired reverse ratio of 5.22. The reverse gear ratio depression of the pedal creates a engine speed request which would result in an RPM of the engine of X.

B) and C): Steps B) and C) from Example 1 are done.

D) Step D) of Example 1 is done, except that the engine is controlled to have a lower RPM than the command of the engine speed request. Thus, the RPM of the engine is controlled to be about X×4.17/5.22=about 0.8 X, where X is the speed normally commanded by the operator's engine speed request from the pedal. This can be done by reducing the operator's engine speed request electronically. As the vehicle moves in reverse, the operator can change X by using the pedal, and the engine speed will be adjusted accordingly by the processor such that the RPM of the engine is about 0.8 X.

EXAMPLE 3

A) Step A) from Example 1 is done, except that the last forward gear is F6 instead of F8. Thus, the desired reverse ratio is that of F4, which is 8.15.

B) Step B) from Example 1 is done, resulting in a selection of reverse gear RM3 with a reverse ratio of 8.15, which is the same as the desired reverse ratio.

C) The power shift transmission changes gear from F6 to RM3, and the processor changes the gear display from F6 to R4.

D) Step D) from Example 1 is done. Since the reverse gear ratio of the selected reverse mechanical gear is not less than the desired reverse ratio (they are the same), there engine RPM is based on the engine speed request from the operator without modification.

EXAMPLE 4

A) Step A) from Example 1 is done, except that the last forward gear is F14 instead of F8. Thus, the desired reverse ratio would be equivalent to F12, which would be 1.37.

B) The reverse gear ratio index increases until it is set to "6," but the predetermined reverse ratio (which can go as low as 1.71) is always more than the desired reverse ratio of 1.37. This occurs because there is no real reverse mechanical gear that has a reverse gear ratio less than or equal to 1.37. The processor automatically selects RM6 as the reverse gear since that is the highest available reverse mechanical gear.

C) The power shift transmission changes the gear from F14 to RM6, and the processor changes the gear display from F14 to R11.

D) Step D) from Example 1 is done. Since the reverse gear ratio of the selected reverse mechanical gear is higher than the desired reverse ratio, the engine RPM is based upon the engine speed request without modification. A signal may be provided to the operator indicating that the offset was not carried out.

EXAMPLE 5

A) Step A) from Example 1 is done, except that the last forward gear is F1 instead of F8. The desired reverse ratio cannot be determined since there are no forward gears less than F1.

B), C), and D): The processor automatically selects RM1 as the reverse gear and the transmission changes gear from F1 to RM1. The processor changes the gear display from F1 to R1. The engine RPM is based on the engine speed request without modifications. A signal may be provided to the operator indicating that the offset was not carried out.

EXAMPLE 6

A) Step A) from Example 1 is done, except that the offset is zero and the last forward gear is F9. The desired reverse ratio is about 2.67, which is the gear ratio of F9.

B) Step B) from Example 1 is done and reverse gear RM6 is selected, which has a reverse ratio of 1.71.

C) The power shift transmission changes gear from F9 to R11, and the processor changes the gear display from F9 to R9.

D) Step D) from Example 1 is done. The engine RPM is controlled to be about 1300 (2000×1.71/2.67=1281).

In all the above examples, a shift back to forward gear during shuttling will put the vehicle in the last forward gear used and the engine RPM will be based on the engine speed request from the operator without adjustment.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A vehicle configured to perform shuttle-shifting, comprising:
   an engine;
   a power shift transmission operably connected with the engine comprising forward and reverse mechanical gears, the power shift transmission having more forward mechanical gears than reverse mechanical gears; and
   a processor operably connected to the power shift transmission and to the engine, the processor being configured to:
   receive a command from a user to establish a relationship between a last forward gear used and a desired reverse performance,
   determine a desired reverse gear ratio based upon the last forward gear used and the established relationship,
   identify a first predetermined reverse gear ratio associated with a first reverse mechanical gear, wherein the first predetermined reverse gear ratio is the same as or less than the desired reverse gear ratio;
   identify a second predetermined reverse gear ratio associated with a second mechanical gear, wherein the second predetermined reverse gear ratio is greater than the desired reverse gear ratio;
   compare the first predetermined reverse gear ratio to the desired reverse gear ratio and the second predetermined reverse gear ratio to the desired reverse gear ratio;
   determine whether the second predetermined reverse gear ratio is closer than the first predetermined reverse gear ratio to the desired reverse gear ratio by a predetermined threshold;
   determine whether an engine rotation rate is sufficiently adjustable to compensate for a difference between the second predetermined reverse gear ratio and the desired reverse gear ratio;
   select the first predetermined reverse gear ratio while the second predetermined reverse gear ratio is not closer to the desired reverse gear ratio by the predetermined threshold or while the engine rotation rate is not sufficiently adjustable to compensate for the difference;
   control the power shift transmission to effectuate a shift to a reverse mechanical gear associated with the selected first predetermined reverse gear ratio, and if the selected first predetermined reverse gear ratio is less than the desired reverse gear ratio, control the engine rotation rate to compensate for a difference between the selected first predetermined reverse gear ratio and the desired reverse gear ratio.

2. The vehicle according to claim 1, wherein if the established relationship is that the desired reverse performance is the same as that of the last forward gear used, then the desired reverse gear ratio will be determined to be the same as a ratio of the last forward gear used, and if the established relationship is such that the desired reverse performance is different from that of the last forward gear used, then the desired reverse gear ratio will be determined as different from the gear ratio of the last forward gear used.

3. The vehicle according to claim 1, wherein the processor is configured to
set a reverse gear ratio index to a first number, wherein the first number corresponds to the first predetermined reverse gear ratio.

4. The vehicle according to claim 3, wherein lower numbers for the reverse gear ratio index correspond to higher reverse ratios.

5. The vehicle according to claim 3, wherein the processor is configured to set the reduced gear ratio index to a second number having one unit less than the first number and corresponding to the second predetermined gear ratio.

6. The vehicle according to claim 1, wherein the processor is further configured to adjust the engine rotation rate based on an engine rotation rate corresponding to an engine speed request from an operator, the ratio of the selected reverse mechanical gear, and the desired reverse ratio.

7. The vehicle according to claim 1, wherein the processor is configured to:
select the second predetermined reverse gear ratio while the second predetermined reverse gear ratio is closer to the desired reverse gear ratio by the predetermined threshold and the engine rotation rate is sufficiently adjustable to compensate for the difference; and
control the power shift transmission to effectuate a shift to a second reverse mechanical gear associated with the selected second predetermined reverse gear ratio and control the engine rotation rate to compensate for the difference between the selected second predetermined reverse gear ratio and the desired reverse gear ratio.

8. The vehicle according to claim 1, wherein the predetermined threshold is 10 percent.

9. A method for performing shuttle-shifting in a vehicle, including:
providing a power shift transmission operably connected to an engine, the power shift transmission including forward and reverse mechanical gears, the power shift transmission having more forward mechanical gears than reverse mechanical gears, the method comprising using a processor to perform the steps of:
establishing a relationship between a last forward gear used and a desired reverse performance,
determining a desired reverse gear ratio based upon the last forward gear used and the established relationship,
identifying a first reverse mechanical gear having a first predetermined reverse gear ratio which is the same or less than the desired reverse gear ratio;
identifying a second reverse mechanical gear having a second predetermined reverse gear ratio which is greater than the desired reverse gear ratio;
comparing the first predetermined reverse gear ratio to the desired reverse gear ratio and the second predetermined reverse gear ratio to the desired reverse gear ratio;
determining whether the second predetermined reverse gear ratio is closer than the first predetermined reverse gear ratio to the desired reverse gear ratio by a predetermined threshold;
determining whether an engine rotation rate is sufficiently adjustable to compensate for a difference between the second predetermined reverse gear ratio and the desired reverse gear ratio;
selecting the first predetermined reverse gear ratio while the second predetermined reverse gear ratio is not closer to the desired reverse gear ratio by the predetermined threshold or while the engine rotation rate is not sufficiently adjustable to compensate for the difference; and
controlling the power shift transmission to shift to a reverse mechanical gear associated with the selected first reverse gear ratio, and if the selected first predetermined reverse gear ratio is less than the desired reverse gear ratio, controlling the engine rotation rate to compensate for a difference between the selected first predetermined reverse gear ratio and the desired reverse gear ratio.

10. The method according to claim 9, wherein if the established relationship is that the desired reverse performance is the same as that of the last forward gear used, then the desired reverse gear ratio is determined to be the same as a ratio of the last forward gear used, and if the established relationship is that the desired reverse performance is different from that of the last forward gear used, then the desired reverse gear ratio is determined to be different from the gear ratio of the last forward gear used.

11. The method according to claim 9, comprising
setting a reverse gear ratio index to a first number, wherein the first number corresponds to the first predetermined gear ratio.

12. The method according to claim 11, wherein lower numbers for the reverse gear ratio index correspond to higher reverse ratios.

13. The method according to claim 11, comprising setting a reduced gear ratio index to a second number having one unit less than the first gear ratio index and corresponding to the second predetermined gear ratio.

14. The method according to claim 9, wherein controlling engine rotation rate to compensate for the difference between the first predetermined reverse gear ratio of the first selected reverse mechanical gear and the desired reverse ratio comprises controlling the engine rotation rate based on an engine rotation rate corresponding to an engine speed request from an operator, the ratio of the selected reverse mechanical gear, and the desired reverse ratio.

15. The method according to claim 9, comprising:
selecting the second predetermined reverse gear ratio while the second predetermined reverse gear ratio is closer to the desired reverse gear ratio by the predetermined threshold and the engine rotation rate is sufficiently adjustable to compensate for the difference; and
controlling the power shift transmission to shift to a second reverse mechanical gear associated with the selected second predetermined reverse gear ratio and controlling the engine rotation rate to compensate for the difference between the selected second predetermined reverse gear ratio and the desired reverse gear ratio.

16. The method according to claim 9, wherein the predetermined threshold is 10 percent.

17. A vehicle configured to perform shuttle-shifting, comprising:
an engine;
a power shift transmission operably connected with the engine comprising forward and reverse mechanical gears, the power shift transmission having more forward mechanical gears than reverse mechanical gears; and
a processor operably connected to the power shift transmission and to the engine; wherein
the processor is configured to receive a command from a user to establish a relationship between a last forward gear used and a desired reverse performance, and the processor is configured to determine a desired reverse ratio based upon the last forward gear used and the established relationship, wherein if the established relationship is such that the desired reverse performance is the same as that of the last forward gear used, then the desired reverse ratio will be determined to be the same as a gear ratio of the last forward gear used, and if the established relationship is such that the desired reverse performance is different from that of last forward gear used, then the desired reverse ratio will be determined as different from the gear ratio of the last forward gear, and wherein the processor is configured to:
a) set a reverse gear ratio index to a first number, the first number being a lowest number possible for the reverse gear ratio index, wherein the reverse gear index comprises consecutive numbers of increasing value and wherein each number corresponds to a predetermined reverse ratio and increasing numbers correspond to lower predetermined reverse ratios,
b) identify the predetermined reverse ratio corresponding to the selected reverse gear ratio index number,
c) compare the predetermined reverse ratio with the desired reverse ratio, wherein if the predetermined reverse ratio is the same or less than the desired reverse ratio, a reverse mechanical gear which corresponds to the first number is selected and the processor controls the power shift transmission to shift to the selected reverse mechanical gear,
d) if the predetermined reverse ratio is higher than the desired reverse ratio, the reverse gear ratio index is incremented by increasing the first number such that the predetermined reverse ratio corresponds to a lower predetermined reverse ratio, and the identifying of a predetermined reverse ratio in b) above is repeated, and c) above is repeated,
e) if the predetermined reverse ratio is higher than the desired reverse ratio, then d) is repeated, causing the reverse gear ratio index to increase and the corresponding predetermined reverse ratio to decrease until the predetermined reverse ratio is less than or equal to the desired reverse ratio or until the first number is a highest number possible, and wherein if the first number is a highest number possible or the predetermined reverse ratio is less than or equal to the desired reverse ratio, then a reverse mechanical gear which corresponds to the reverse gear ratio index is selected, and
f) determine whether the ratio of the selected reverse mechanical gear is lower than the desired reverse ratio, and if the ratio of the selected reverse mechanical gear is lower than the desired reverse ratio, control an engine speed command to the engine based on an engine rotation rate corresponding to an engine speed request from an operator, the ratio of the selected reverse mechanical gear, and the desired reverse ratio.

18. The vehicle according to claim 17, wherein while the reverse gear ratio index is the highest number possible, the processor is configured to identify that the ratio of the selected reverse mechanical gear is higher than the desired reverse ratio and to control the engine speed command to the engine based on an engine rotation rate corresponding to an engine speed request from an operator, the gear ratio of the selected reverse mechanical gear, and the desired reverse ratio.

19. A method for performing shuttle-shifting in a vehicle, comprising:
providing a power shift transmission operably connected with an engine and comprising forward and reverse mechanical gears, the power shift transmission having more forward mechanical gears than reverse mechanical gears;
providing a reverse gear ratio index having consecutive numbers of increasing value wherein each number corresponds to a predetermined reverse ratio and increasing numbers correspond to lower predetermined reverse ratios;
receiving, at a processor, a command from a user to establish a relationship between a last forward gear used and a desired reverse performance;
determining, via the processor, a desired reverse ratio based upon the last forward gear used and the established relationship, wherein if the established relationship is such that the desired reverse performance is the same as the that of the last forward gear used, then the desired reverse ratio will be determined to be the same as a ratio of the last forward gear used, and if the established relationship is such that the desired reverse performance is different from that of the last forward gear used, then the desired reverse ratio will be determined as different from the ratio of the last forward gear used, the method further comprising using the processor to perform the steps of:
a) setting a reverse gear ratio index to a first number, the first number being a lowest possible number for the reverse gear ratio index;
b) identifying the predetermined reverse ratio corresponding to the reverse gear ratio index;
c) comparing the predetermined reverse ratio with the desired reverse ratio, wherein if the predetermined reverse ratio is the same or less than the desired reverse ratio, a reverse mechanical gear which corresponds to the first number is selected and the power shift transmission shifts to the selected reverse mechanical gear;
d) if the predetermined reverse ratio is higher than the desired reverse ratio, the reverse gear ratio index is incremented by increasing the first number such that the predetermined reverse ratio corresponds to a lower predetermined reverse ratio, the identifying of a predetermined reverse ratio in b) above is repeated, and c) above is repeated;
e) if the predetermined reverse ratio is higher than the desired reverse ratio, then d) is repeated, causing the reverse gear ratio index to increase and the corresponding predetermined reverse ratio to decrease until the predetermined reverse ratio is less than or equal to the desired reverse ratio or until the first number is a highest number possible, and wherein if the first number is a highest number possible or the predetermined reverse ratio is higher than the desired reverse ratio, then a reverse mechanical gear which corresponds to the reverse gear ratio index is selected; and
f) determining whether the ratio of the selected reverse mechanical gear is lower than the desired reverse ratio and if the ratio of the selected reverse mechanical gear is lower than the desired reverse ratio, controlling an engine speed command to the engine based on an engine rotation rate corresponding to an engine speed request from an operator, the gear ratio of the selected reverse mechanical gear, and the desired reverse ratio.

20. The method according to claim 19, wherein while the reverse gear ratio index is the highest number possible, identifying that the ratio of the selected reverse mechanical gear is higher than the desired reverse ratio and controlling the engine speed command to the engine based on an engine rotation rate corresponding to an engine speed request from an operator, the gear ratio of the selected reverse mechanical gear, and the desired reverse ratio.

* * * * *